(12) United States Patent
Sato et al.

(10) Patent No.: US 7,538,978 B2
(45) Date of Patent: May 26, 2009

(54) HEAT ASSISTED MAGNETIC RECORDING HEAD AND HEAT ASSISTED MAGNETIC RECORDING APPARATUS FOR HEATING A RECORDING REGION IN A MAGNETIC RECORDING MEDIUM DURING MAGNETIC RECORDING

(75) Inventors: Isamu Sato, Tokyo (JP); Taro Oike, Tokyo (JP); Naoki Hanashima, Sendai (JP)

(73) Assignee: TDK Corporation, Tokyo (JP)

( * ) Notice: Subject to any disclaimer, the term of this patent is extended or adjusted under 35 U.S.C. 154(b) by 569 days.

(21) Appl. No.: 11/319,164

(22) Filed: Dec. 28, 2005

(65) Prior Publication Data

US 2006/0187564 A1 Aug. 24, 2006

(30) Foreign Application Priority Data

Dec. 28, 2004 (JP) .............................. 2004-380527

(51) Int. Cl.
*G11B 5/00* (2006.01)
(52) U.S. Cl. .................................................... 360/128
(58) Field of Classification Search ........................ None
See application file for complete search history.

(56) References Cited

U.S. PATENT DOCUMENTS 6,714,370 B2 * 3/2004 McDaniel et al. ............. 360/59

2003/0128452 A1 * 7/2003 McDaniel et al. ............. 360/59
2004/0001420 A1 * 1/2004 Challener .............. 369/112.27
2005/0135008 A1 * 6/2005 Challener et al. ........... 360/128

FOREIGN PATENT DOCUMENTS

| JP | B2 2665022 | 6/1997 |
| JP | B2 3441417 | 6/2003 |
| JP | B2 3471285 | 9/2003 |

* cited by examiner

*Primary Examiner*—David D Davis
(74) *Attorney, Agent, or Firm*—Oliff & Berridge, LLC

(57) ABSTRACT

A heat assisted magnetic recording head is provided, which can prevent an effect of a heat in a laser diode when a magnetic recording region is heated by a heating laser beam and which can reduce its size and weight. In the heat assisted magnetic recording head, a recording magnetic pole, a magnetic recording element, a magnetic read element, an optical waveguide, and an irradiating optical waveguide are attached to a floating slider provided below a suspension. The laser diode is arranged on an opposite side of the suspension to the floating slider. The heating laser beam emitted from the laser diode is directed to the irradiating optical waveguide through the optical waveguide, so that a magnetic recording medium is irradiated with the heating laser beam exiting from the irradiating optical waveguide.

18 Claims, 11 Drawing Sheets

HEAT ASSISTED MAGNETIC RECORDING HEAD AND HEAT ASSISTED MAGNETIC RECORDING APPARATUS FOR HEATING A RECORDING REGION IN A MAGNETIC RECORDING MEDIUM DURING MAGNETIC RECORDING

BACKGROUND OF THE INVENTION

1. Field of the Invention

The present invention relates to a heat assisted magnetic recording head that is included in a magnetic recording apparatus and heats a recording region in a magnetic recording medium during magnetic recording, and also relates to a heat assisted magnetic recording apparatus using the same.

2. Description of the Related Art

Information is recorded onto a magnetic recording medium such as HDD (Hard Disk Drive) and DASD (Direct Access Storage Device) by using a recording element of a magnetic head that moves above the magnetic recording medium while floating. Moreover, digital information recorded on the magnetic recording medium is detected by using a reproduction element of the magnetic head. It is necessary to increase coercivity Hc of a recording layer and make a grain diameter (D) of crystals of a material forming the recording layer smaller in order to increase a recording density of the magnetic recording medium. However, when the crystal grain diameter is made smaller, thermal disturbance may make magnetization of crystal grains in which information is recorded unstable or disappearance of recorded magnetization, for example.

It is desirable that a value of $Ku \cdot V/k \cdot T$ is 70 or more in accordance with a guideline for showing a state of stability of magnetization, where Ku is an anisotropic energy, V is a volume of a crystal grain, k is Boltzmann constant, and T is an absolute temperature.

Thus, development of a recording film having an anisotropic energy that is on the order of $10^7$ erg/cc, such as FeCo and CoPt, has been advanced in order to achieve high-density recording in which a recording density is several hundreds of gigabits per square inch.

However, Ku and Hc have a relationship that Hc nearly equals to 2 Ku/Ms under primary approximation, where Ms is saturated magnetization of a crystal grain. Thus, when Ku is made larger, Hc also becomes larger and may exceed 10 kOe that is twice or more Hc (3 to 4 kOe) of an actual magnetic recording medium.

Recording of information onto a magnetic recording medium is achieved by a recording magnetic field generated by a recording element of a magnetic head, as described above, and it is believed that the recording usually requires application of the recording magnetic field that is about twice as large as the aforementioned coercivity Hc. The intensity of the recording magnetic field is determined by the shape of a recording element, the saturated magnetic flux density Bs of a material for the recording element, and the like. Especially, the saturated magnetic flux density Bs largely affects the intensity of the recording magnetic field.

At the present day, a recording element material having Bs nearly equal to 2 T (tesla) is at a leading edge of practically usable recording element materials. Moreover, it is shown in a Slater-Pauling curve that 2.4 T is a limit of a practical level of Bs. Therefore, it is very difficult to record digital information onto a recording film having Hc larger than 10 kOe.

In order to overcome the above problem, a method called as heat assisted recording has been proposed, in which a light beam that can form a converged spot is made incident on a magnetic recording medium so as to heat a recording film while a recording magnetic field is applied to the magnetic recording medium by means of a magnetic head. In this manner, while Hc of the recording film is lowered, information is recorded onto the recording film. Japanese Patent No. 3471285 proposes a magnetic head with a heat source and/or a heat sink mounted thereon in conjunction with the principle of the above heat assisted recording. Japanese Patent No. 3441417 proposes a magnetic head including an opening for near-field emission. Japanese Patent No. 2665022 proposes a method in which an arc-like recording pattern is formed.

However, Japanese Patent Nos. 3471285 and 3441417 do not disclose how to mount various members for achieving assist with a heat, such as a heat source, an optical path, and a heat sink on a small magnetic head having a slider length of 1 mm or less that is actually needed in a compact manner. Moreover, in an actual use, a power of a light beam is not sufficient for heating the recording film to a high temperature and it is necessary to separate a magnetic system and an optical system from each other as measures for a heat. However, Japanese Patent Nos. 3471285 and 3441417 do not disclose how to overcome those problems.

Furthermore, the technique of Japanese Patent No. 2665022 has a problem that the arc-like recording pattern is largely affected by an edge noise and crosstalk.

SUMMARY OF THE INVENTION

In view of the foregoing problems, various exemplary embodiments of this invention provide a heat assisted magnetic recording head that can achieve compact mounting of members for achieving assist with a heat such as a heat source, an optical path, and a heat sink.

Various exemplary embodiments of this invention further provide a heat assisted magnetic recording head that can use a laser diode having a sufficient emission power for heating a recording film to a high temperature and can separate a magnetic system and an optical system from each other.

Various exemplary embodiments of this invention further provide a heat assisted magnetic recording head that enables magnetic recording with a small edge noise and less crosstalk.

various exemplary embodiments of this invention further provide a magnetic recording apparatus using the aforementioned heat assisted magnetic recording head.

various exemplary embodiments of the present invention described below can achieve the above objects.

(1) A heat assisted magnetic recording head includes: a magnetic recording element including a recording magnetic pole and a magnetic read element that are mounted on a floating slider; a laser diode serving as a light source of a heating laser beam; and an irradiating optical waveguide, arranged close to the magnetic recording element, for directing the heating laser beam from the irradiating optical waveguide at the front side thereof to a minute magnetizing region of a magnetic recoding medium in which recording is performed by the recording magnetic pole, wherein an optical waveguide for directing the heating laser beam to the irradiating optical waveguide is provided on a rear side of the irradiating optical waveguide.

(2) In the heat assisted magnetic recording head recited in (1), at least part of the optical waveguide near a connection to the irradiating optical waveguide is a mode-conversion type waveguide that converts the heating laser beam into a TM wave.

(3) In the heat assisted magnetic recording head recited in (2), the mode-conversion type waveguide has a flat shape in a plane that is perpendicular to a top end face of the magnetic read element and recording magnetic pole and extends in a direction from the recording magnetic pole to the magnetic read element, the flat shape being elongate in the direction, and a thickness of the mode-conversion type waveguide in a direction perpendicular to the direction is the same as that of the irradiating optical waveguide.

(4) In the heat assisted magnetic recording head recited in (3), a tapered top end face is formed at an end of the mode-conversion type waveguide on a side close to the irradiating optical waveguide, the tapered top end face tapering toward the connection to the irradiating optical waveguide in the plane.

(5) In the heat assisted magnetic recording head recited in any one of (1) to (4), at least a part of the optical waveguide is formed on the floating slider.

(6) In the heat assisted magnetic recording head recited in any one of (1) to (5), the laser diode is attached on a rear side of the floating slider in such a manner that the heating laser beam emitted from the laser diode is incident on an incident surface of the optical waveguide, the incident surface being located on an opposite side to the irradiating optical waveguide.

(7) In the heat assisted magnetic recording head recited in (6), the floating slider is supported by a surface of a suspension, a heat sink is supported by another surface of the suspension, the laser diode is supported by the heat sink, and the heating laser beam emitted from the laser diode is incident on the incident surface of the optical waveguide via the suspension.

(8) In the heat assisted magnetic recording head recited in (6), the floating slider is supported by a suspension via a heat sink, the laser diode is supported by the heat sink, and the heating laser beam emitted from the laser diode is incident on the incident surface of the optical waveguide through the suspension.

(9) In the heat assisted magnetic recording head recited in (6), the floating slider is supported by a surface of a suspension, and a second optical waveguide is provided on another surface of the suspension, the second optical waveguide being optically connected to the incident surface of the optical waveguide at its top end and to a surface of the laser diode from which the heating laser beam is emitted, at its base end.

(10) In the heat assisted magnetic recording head recited in (9), the top end of the second optical waveguide is optically connected to the incident surface of the optical waveguide via a V-shaped groove mirror that is provided on the other surface of the suspension.

(11) In the heat assisted magnetic recording head recited in (9) or (10), the second optical waveguide is a polymer waveguide.

(12) In the heat assisted magnetic recording head recited in any one of (1) to (11), the irradiating optical waveguide is formed from a dielectric material having a dielectric constant $\epsilon$ of 1 or more, the dielectric material including air, a front shape of the irradiating optical waveguide is one of a C-shape, a D-shape, an E-shape, a trapezoidal shape, a modified H-shape, and an L-shape, and the irradiating optical waveguide is configured in such a manner that the heating laser beam is emitted along a long side extending in a direction perpendicular to a relative movement direction of the recording magnetic pole and a recording medium with respect to each other, and the heating laser beam is flat in the direction.

(13) In the heat assisted magnetic recording head recited in any one of (1) to (12), the recording magnetic pole has a magnetic monopole structure for perpendicular magnetic recording, the pole being formed from a soft magnetic metal, the recording magnetic pole is isolated by shields for the recording magnetic pole arranged on both sides of the recording magnetic pole in a thickness direction that is a relative movement direction of the recording magnetic pole with respect to a magnetic recording medium, a front shape of the recording magnetic pole is trapezoidal or rectangular, and a thickness Pt of the recording magnetic pole in the thickness direction and a width Pw thereof in a width direction perpendicular to the thickness direction are 20 nm or more and 200 nm or less.

(14) In the heat assisted magnetic recording head recited in (13), a width Gw of the irradiating optical waveguide in the width direction and a height Gt thereof in the thickness direction each are 100 nm or less and satisfy Gw≦Pw and Gt≦Pt.

(15) In the heat assisted magnetic recording head recited in (14), the irradiating optical waveguide is arranged in one of a region located on a trailing side of a center of the recording magnetic pole and a region adjacent to a trailing edge of the recording magnetic pole in such a manner that the heating laser beam exiting from the irradiating optical waveguide is an evanescent wave having a beam diameter of 100 nm or less and a position irradiated with the evanescent wave of a maximum power is located within ±20 to 40 nm from the trailing edge in the relative movement direction.

(16) In the heat assisted magnetic recording head recited in any one of (1) to (12), the recording magnetic pole is formed from a soft magnetic metal and has a ring structure for longitudinal recording that includes a trailing side recording magnetic pole and a leading side recording magnetic pole, the leading recording magnetic pole being trimmed, a front shape of the trailing side recording magnetic pole is rectangular, and a thickness Pt of the recording magnetic pole in a thickness direction and a width Pw thereof in a width direction perpendicular to the thickness direction each are 200 nm or less, the thickness direction being a relative movement direction of the recording magnetic pole with respect to the magnetic recording medium.

(17) In the heat assisted magnetic recording head recited in (16), a width Gw of the irradiating optical waveguide in the width direction and a height Gt thereof in the thickness direction each are 100 nm or less and satisfy Gw≦Pw and Gt≦Pt.

(18) In the heat assisted magnetic recording head recited in (16) or (17), the irradiating optical waveguide is arranged in one of a region located on a trailing side of a center of the recording magnetic pole and a region adjacent to a trailing edge of the recording magnetic pole in such a manner that the heating laser beam exiting from the irradiating optical waveguide is an evanescent wave having a beam diameter of 100 nm or less and a position irradiated with the evanescent wave of a maximum power is within ±20 to 40 nm from the trailing edge in the relative movement direction.

(19) The heat assisted magnetic recording head recited in any one of (1) to (18) includes a laser controller for controlling a timing of emission of the heating laser beam by the laser diode, and the laser controller performs control in such a manner that the minute magnetizing region is irradiated with the heating laser beam within ±3 nS from a timing at which the minute magnetizing region is magnetized by the recording magnetic pole when L/v<3 nS, where L is a distance between the recording magnetic pole and the magnetic read element and v is a relative movement speed of the magnetic recoding medium with respect to the recording magnetic pole and the magnetic read element in a vicinity of the recording magnetic pole and the magnetic read element.

(20) The heat assisted magnetic recording head recited in any one of (1) to (28) includes a laser controller for controlling a timing of emission of the heating laser beam by the laser diode, and the laser controller performs control in such a manner that the minute magnetizing region is irradiated with the heating laser beam prior to a timing at which the minute magnetizing region is magnetized by the recording magnetic pole when L/v≧3 nS, where L is a distance between the recording magnetic pole and the magnetic read element and v is a relative movement speed of the magnetic recording medium with respect to the recording magnetic pole and the magnetic read element in a vicinity of the recording magnetic pole and the magnetic read element.

(21) In the heat assisted magnetic recording head recited in (19) or (20), the laser controller is arranged to control the laser diode to make pulse oscillation in synchronization with the recording magnetic pole.

(22) A magnetic recording apparatus includes the heat assisted magnetic recording head recited in any one of (1) to (21), and the magnetic recording medium, wherein the magnetic recording medium includes a recording layer having an anisotropic property in a thickness direction, and the recording layer is formed from one of a magnetic material and a magnetooptical material in which coercivity Hc lowered by temperature increase caused by irradiation with the heating laser beam is 10 kOe or less during recording.

(23) A magnetic recording apparatus includes the heat assisted magnetic recording head recited in any one of (1) to (21), and the magnetic recording medium, wherein the magnetic recording medium includes a recording layer having an anisotropic property in a relative movement direction of the magnetic recording medium with respect to the recording magnetic pole, and the recording layer is formed from a magnetic material in which coercivity Hc lowered by temperature increase caused by irradiation with the heating laser beam is 8 kOe or less during recording.

(24) In the magnetic recording apparatus recited in (22) or (23), the magnetic recording medium includes a plurality of layers, and in at least one of the plurality of layers, at least a region that is adjacent to the minute magnetizing region or an overlapping region overlapping the minute magnetizing region in the thickness direction in a direction perpendicular to a relative movement direction of the magnetic recording medium with respect to the recording magnetic pole is formed from a nonmagnetic layer having a lower thermal conductivity than that of the minute magnetizing region or the overlapping region.

In the above exemplary embodiments, the heating laser beam emitted from the laser diode is directed toward the rear side of the irradiating optical waveguide by using the optical waveguide and is made incident on the magnetic recording medium through the irradiating optical waveguide. Therefore, even when a slider length is 1 mm or less, it is possible to achieve compact mounting of the laser diode or other necessary parts such as the heat sink. Moreover, the use of the optical waveguide can allow the laser diode to be provided away from the recording magnetic pole. Therefore, even if an output of the laser diode is made larger, the magnetic system is not affected by a heat.

DETAILED DESCRIPTION OF THE PREFERRED EMBODIMENTS

Figure 1:
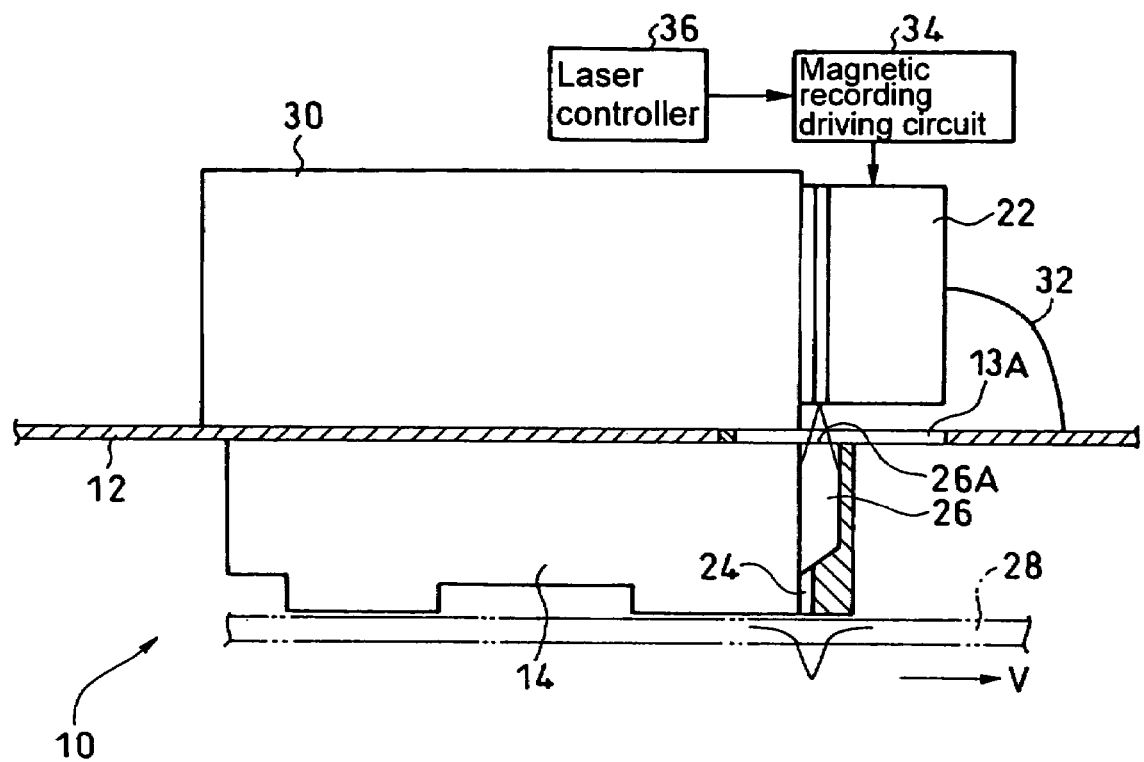
FIG. 1 is an enlarged cross-sectional view of a heat assisted magnetic recording head according to a first exemplary embodiment of the present invention.

A heat assisted magnetic recording head of the best mode for carrying out the present invention includes: a magnetic recording element including a recording magnetic pole and a magnetic read element for detecting a reproduction signal that are mounted on a floating slider; a laser diode serving as a light source of a heating laser diode; an irradiating optical waveguide, arranged close to the magnetic recording element, for directing the heating laser beam to a minute magnetizing region of a magnetic recording medium in which recording is performed by the recording magnetic pole; and an optical waveguide, provided on a rear side of the irradiating optical waveguide, for directing the heating light beam to the irradiating optical waveguide. At least part of the optical waveguide near a connection to the irradiating optical waveguide is a mode-conversion type waveguide that converts the heating laser beam into a TM wave. The mode-conversion type waveguide is arranged to have a flat shape in a plane that is perpendicular to a top end face of the magnetic recording element and recording magnetic pole and extends in a direction from the recording magnetic pole to the magnetic read element, the flat shape being elongate in the direction. A thickness of the waveguide in a direction perpendicular to the direction is the same as that of the irradiating optical waveguide. The irradiating optical waveguide is formed from a dielectric material having a dielectric constant ε of 1 or more, the dielectric material including an air. A front shape of the irradiating optical waveguide is one of a C-shape, a D-shape, an E-shape, a trapezoidal shape, a modified H-shape, and an L-shape. The irradiating optical waveguide is arranged in such a manner that the heating laser beam is emitted along a long side extending in a direction perpendicular to a relative movement direction of the recording magnetic pole and the magnetic recording medium and the heating laser beam is flat in the direction perpendicular to the relative movement direction.

A heat assisted magnetic recording head 10 according to a first exemplary embodiment of the present invention is now described with reference to FIG. 1.

The heat assisted magnetic recording head 10 is used for perpendicular magnetic recording and includes: a magnetic recording element 18 including a recording magnetic pole 16 (see FIGS. 2 and 3) and a magnetic read element 20 for detecting a reproduction signal, these elements 18 and 20 being mounted on a floating slider 14 attached to a side face (a lower side face in FIG. 1) of a suspension 12 of HDD (which is not shown entirely in FIG. 1); a laser diode 22 serving as a light source of a heating laser beam; an irradiating optical waveguide 24 for irradiating a magnetic recording medium with the heating laser beam; and an optical waveguide 26 for directing the heating laser beam toward a rear side of the irradiating optical waveguide 24.

The irradiating optical waveguide 24 is formed by a hole (i.e., a space) or is formed from a transparent dielectric material having a dielectric constant ε of 1 or more, such as $SiO_2$ or $Al_2O_3$. The irradiating optical waveguide 24 is arranged in the vicinity of the magnetic recording element 18 so as to allow a heating laser beam to be incident on a minute magnetizing region (described later in detail) of a magnetic recording medium 28 in which recording is performed by means of the recording magnetic pole 16.

The optical waveguide 26 is also formed from a dielectric material having a dielectric constant ε equal to or larger than 1 such as an air, $SiO_2$, or $Al_2O_3$ like the irradiating optical waveguide 24. The optical waveguide 26 is arranged to form a mode-conversion type waveguide that converts a heating laser beam incident on an incident surface 26A located at an upper end thereof in FIG. 1 into a TM wave.

The laser diode 22 is arranged to emit laser light downward in FIG. 1 and make the emitted laser light as a heating laser beam incident on the incident surface 26A of the optical waveguide 26 through a through hole 13A formed in the suspension 12.

The laser diode 22 is supported by a side face of a heat sink 30 that is supported by the suspension 12 on an opposite side to the floating slider 14. The numeral 32 in FIG. 1 denotes a bonding wire for supplying a driving current to the laser diode 22.

Figure 2:
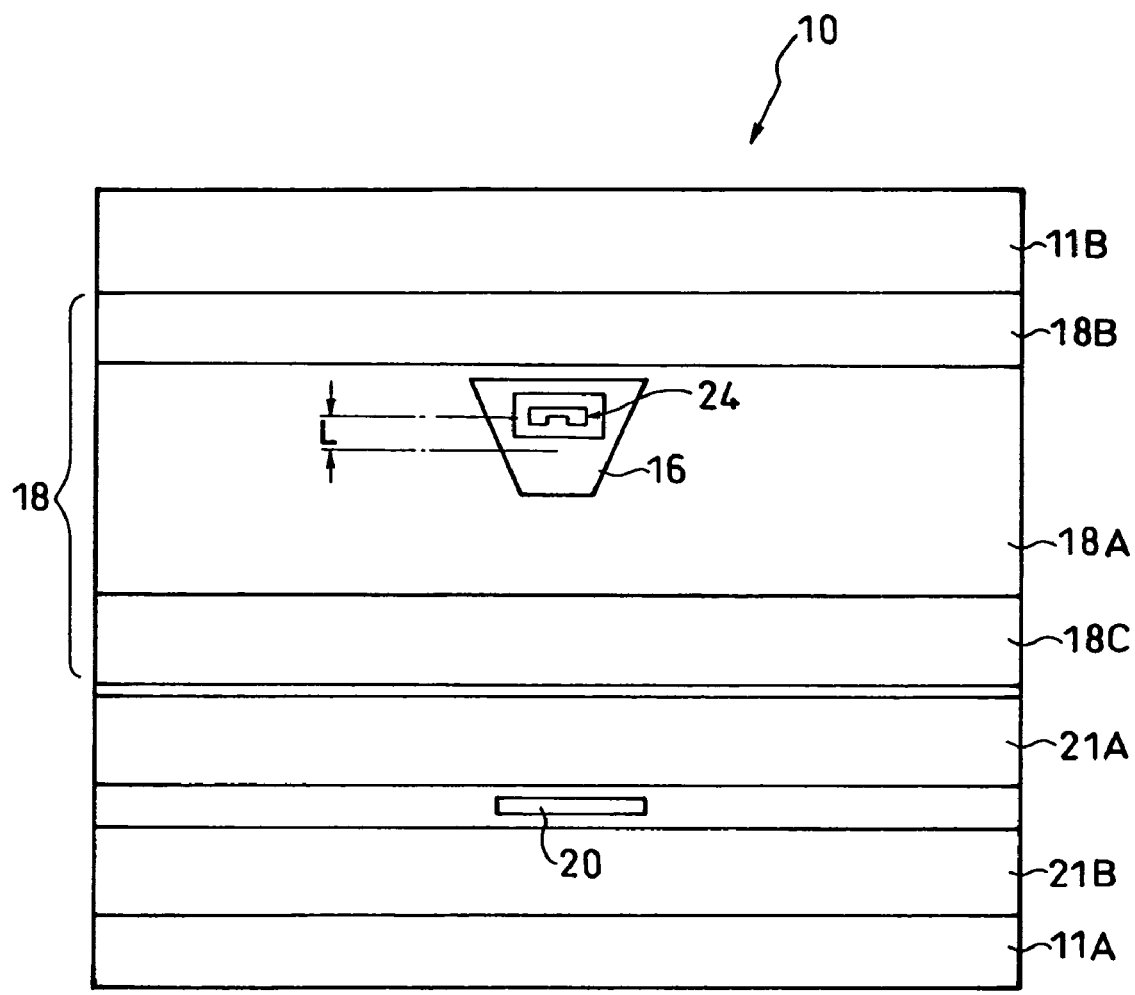
FIG. 2 is an enlarged front view schematically showing a front shape of the heat assisted magnetic recording head of the first exemplary embodiment.
Figure 3:
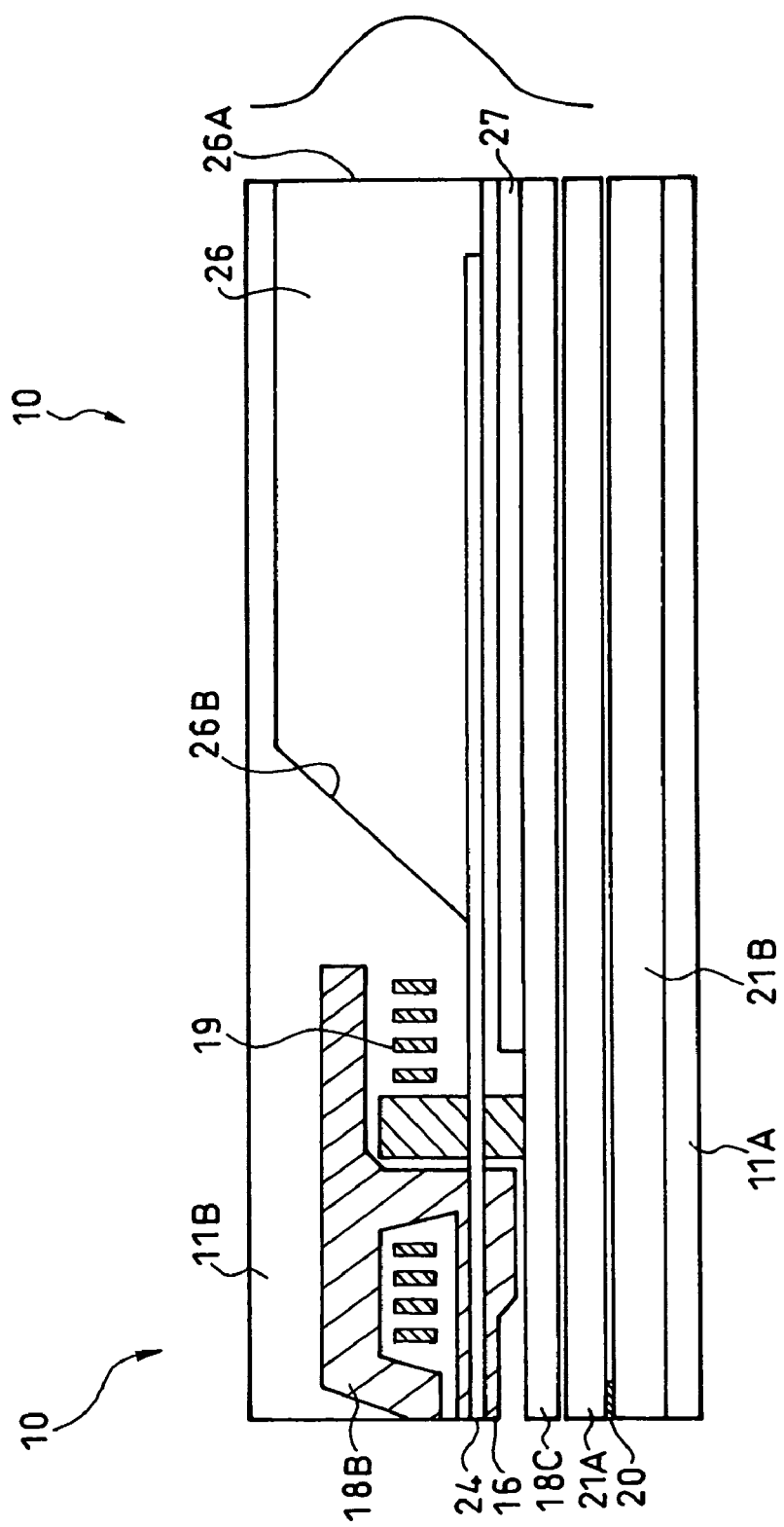
FIG. 3 is an enlarged cross-sectional view schematically showing a region including a recording magnetic pole, a reproducing element, and an optical waveguide in the heat assisted magnetic recording head of the first exemplary embodiment.

The detailed structure of the heat assisted magnetic recording head 10 is described, referring to FIGS. 2 and 3.

The irradiating optical waveguide 24 is provided in the recording magnetic pole 16 that is a magnetic monopole, as shown in FIGS. 2 and 3. In a front surface (i.e., a surface seen from the magnetic recording medium 28 side; ABS surface) of the heat assisted magnetic recording head 10, a nonmagnetic layer 18A surrounds the recording magnetic pole 16 and shield layers 18B and 18C for the recording magnetic pole shield both sides of the nonmagnetic layer 18A in a vertical direction in FIGS. 2 and 3, i.e., a direction of relative movement between the heat assisted magnetic recording head 10 and the magnetic recording medium 28 (hereinafter, referred to as a relative movement direction). Moreover, an upper shied layer 21A and a lower shield layer 21B shield both sides of the magnetic read element 20 in the relative movement direction. The reference alphanumerals 11A and 11B denote a substrate and a cover layer, respectively, in FIGS. 2 and 3.

Moreover, the numeral 19 denotes a coil for forming a recording magnetic field and the numeral 27 denotes a lower cladding core serving as a buffer layer in FIG. 3.

As shown in FIG. 3, the mode-conversion type optical waveguide 26 has a flat shape in a plane that is perpendicular to top end faces of the magnetic read element 20 and the recording magnetic pole 16 and extends in a direction from the recording magnetic pole 16 toward the magnetic read element 20, i.e., the relative movement direction. The flat shape is elongate in the relative movement direction. The thickness of the optical waveguide 26 in a direction perpendicular to the relative movement direction is the same as that of the irradiating optical waveguide 24.

A tapered end face 26B is formed at a top end of the mode-conversion type optical waveguide 26 on a side close to the irradiating optical waveguide 24. The tapered end face 26B tapers toward a connection to the irradiating optical waveguide 24 in the aforementioned plane.

The optical waveguide 26 can serve as a mode-conversion type waveguide when the irradiating optical waveguide 24 has a diameter of 100 nm seen from its front side, the wavelength λ of the heating laser beam incident on the optical waveguide 26 is 700 nm, and a difference of a refractive index Δn between materials respectively forming the optical waveguide 26 and the irradiating optical waveguide 24 satisfies $0.2 < \Delta n < 0.7$, for example.

A length of the optical waveguide 26 in the relative movement direction is 300 μm or more and the thickness thereof is 5 to 10 μm. The irradiating optical waveguide 24 is arranged to extend to the right in FIG. 3 so as to be in contact with a lower side of the optical waveguide 26 over a long length.

Figure 4:
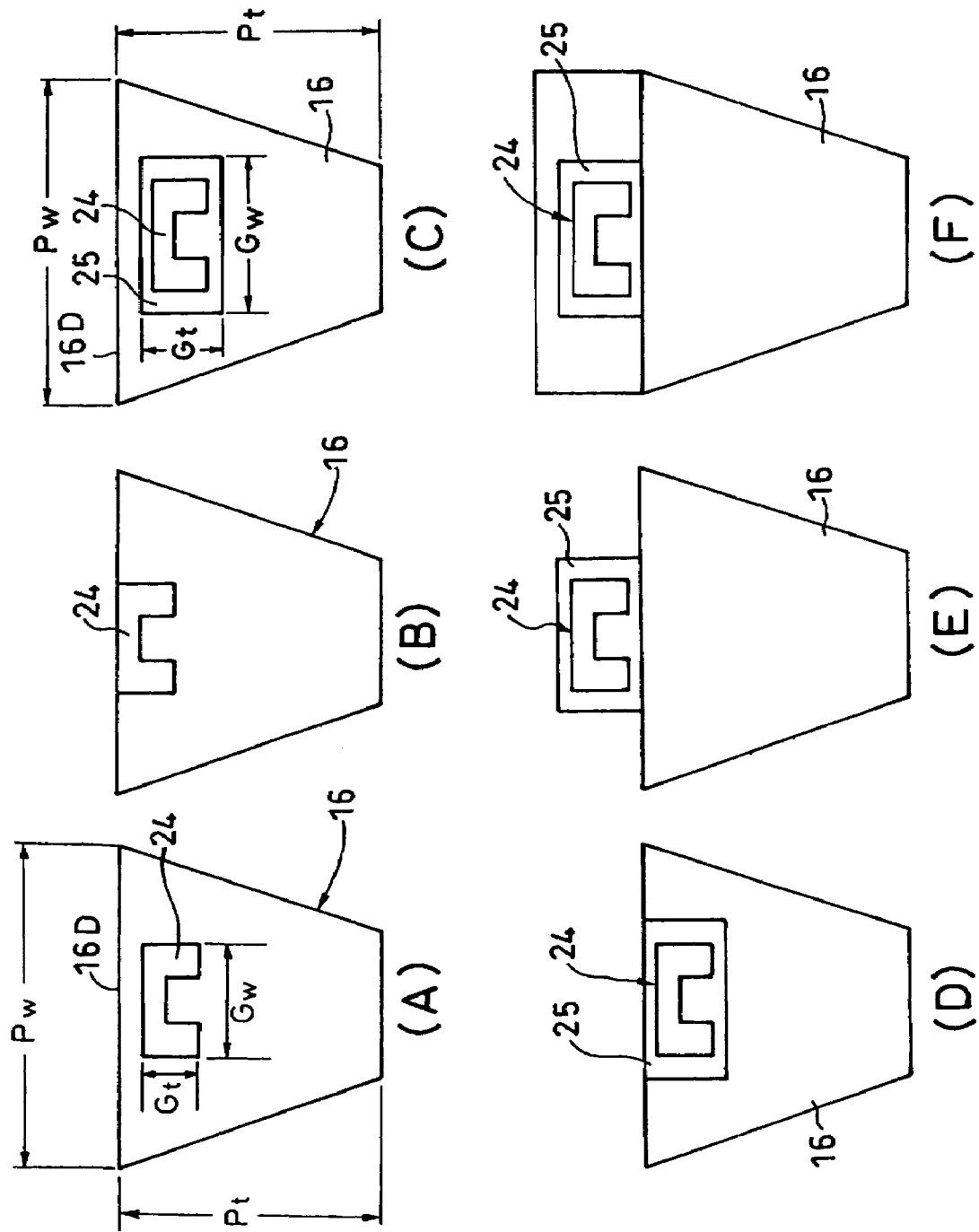
FIGS. 4A to 4F are enlarged front views generally showing a positional relationship between the recording magnetic pole and an irradiating optical waveguide in the heat assisted magnetic recording head of the first exemplary embodiment.

In the first exemplary embodiment, the recording magnetic pole 16 has a magnetic monopole structure for perpendicular magnetic recording that is formed from a soft magnetic metal mainly containing FeNi or FeCo. A front shape of the recording magnetic pole 16 is trapezoidal or rectangular. A thickness Pt of the recording magnetic pole 16 in the relative movement direction and a width Pw thereof in a direction perpendicular to the relative movement direction each are 20 nm or more and 200 nm or less. FIG. 4A shows a positional relationship between the irradiating optical waveguide 24 and the recording magnetic pole 16 that is a magnetic monopole. As shown in FIG. 4A, the irradiating optical waveguide 24 is arranged in the inside of a trailing edge 16D of the recording magnetic pole 16 having an approximately trapezoidal shape, when seen from a front side.

The arrangement of the irradiating optical waveguide 24 with respect to the recording magnetic pole 16 is not limited to the arrangement shown in FIG. 4A. The irradiating optical waveguide 24 may be arranged next to the trailing edge 16D, as shown in FIG. 4B. Alternatively, the irradiating optical waveguide 24 may be arranged in the inside of the trailing edge 16D of the recording magnetic pole 16, while being surrounded by a metal 25, as shown in FIG. 4C, or may be arranged next to the trailing edge 16D in the inside of the trailing edge 16D, while being surrounded by a metal 25, as shown in FIG. 4D. Alternatively, the irradiating optical waveguide 24 may be arranged next to the trailing edge 16D in the outside of the recording magnetic pole 16, as shown in FIG. 4E. In this case, the irradiating optical waveguide 24 may be arranged in a region of the floating slider 14, as shown in FIG. 4F.

The dimensions of the irradiating optical waveguide 24 shown in FIGS. 4A and 4C are described, for example. A width Gw in a width direction perpendicular to the relative movement direction and a height Gt in a thickness direction are 100 nm or less and satisfy $Gw \leq Pw$ and $Gt \leq Pt$.

The irradiating optical waveguide 24 is arranged in one of a region located on the trailing side of a center of the recording magnetic pole 16 or the region adjacent to the trailing edge, as described above, in such a manner that the heating laser beam exiting from the irradiating optical waveguide 24 is an evanescent wave having a beam diameter of 100 nm or less and a position irradiated with the evanescent wave of a maximum power is located within ±20 to 40 nm from the trailing edge 16D in the relative movement direction.

A laser controller 34 controls the laser diode 22 to make pulse oscillation. An emission timing of the heating laser beam from the laser diode 22 is also controlled by the laser controller 34. Moreover, the laser controller 34 performs control in such a manner that a minute magnetizing region (described later) of the magnetic recording medium 28 that is to be magnetized by the recording magnetic pole 16 is irradiated with the pulsed heating laser beam in synchronization with magnetic recording performed by a magnetic recording driving circuit 36 that drives the magnetic recording element 18.

More specifically, the laser controller 34 performs control in such a manner that the minute magnetizing region is irradiated with the heating laser beam within ±3 nS from a timing at which the recording magnetic pole 16 magnetizes the minute magnetizing region when L/v<3 nS is satisfied where L is a distance between (the center of) the magnetic recording pole 16 and the irradiating optical waveguide 24 and v is a relative movement speed of the magnetic recording medium 28 in the vicinity of the recording magnetic pole 16 and the irradiating optical waveguide 24.

Figure 5:
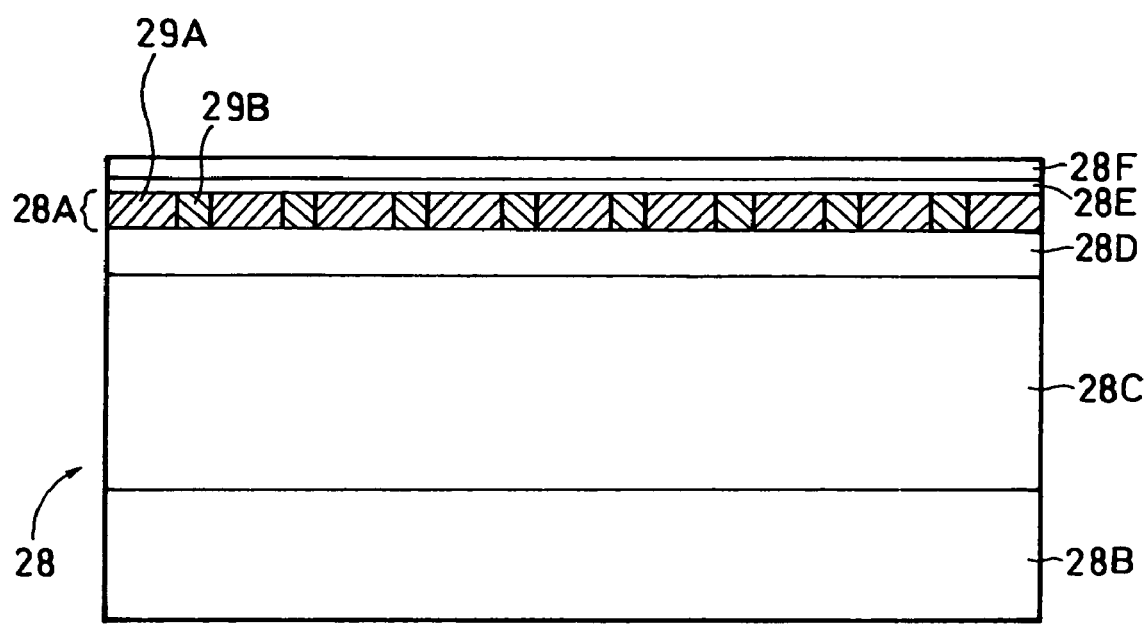
FIG. 5 is an enlarged cross-sectional view schematically showing a discrete type magnetic recording medium suitable for perpendicular magnetic recording.

For example, the magnetic recording medium 28 has a structure in which an underlayer 28C of a soft magnetic material, an intermediate layer 28D of a nonmagnetic material, a recording layer 28A, a protective layer 28E, and a surface lubrication layer 28F are formed on a substrate 28B in that order, as shown in FIG. 5. In the recording layer 28A, the minute magnetizing region 29A and a nonmagnetic region 29B that is adjacent to the minute magnetizing region 29A in a direction perpendicular to the relative movement direction and has a lower thermal conductivity than the minute magnetizing region 29A are repeatedly arranged. The surfaces thereof are flush with each other.

The minute magnetizing region 29A has an anisotropic property in a thickness direction and is formed from one of a magnetic material and a magnetooptical material in which coercivity Hc lowered by temperature increase caused by irradiation with the heating laser beam is 10 kOe or less during recording. Examples of the magnetic material include CoCrPt, FePt, TbFeCo, and PtCo. Examples of the magnetooptical material include TbFeCo and DyFeCo.

Next, a process for recording information onto the magnetic recording medium 28 by the heat assisted magnetic recording head 10 is described.

The magnetic recording driving circuit 36 determines a timing at which magnetic recording is performed for the recording layer 28A of the magnetic recording medium 28 by the recording magnetic pole 16. At this timing, the laser controller 34 drives the laser diode 22 by a driving signal from the magnetic recording driving circuit 36 so as to cause pulse emission.

A pulsed heating laser beam emitted from the laser diode 22 passes through the through hole 13A in the suspension 12 and is incident on the incident surface 26A of the optical waveguide 26. The incident heating laser beam is converted into a TM wave in the optical waveguide 26 and enters the irradiating optical waveguide 24. From the irradiating optical waveguide 24, the TM mode heating laser beam exits toward the magnetic recording medium 28.

In the first exemplary embodiment, the irradiating optical waveguide 24 is configured such that the minute magnetizing region 29A of the recording layer 28A is irradiated with the laser beam prior to magnetic recording by the recording magnetic pole 16. After being heated by the irradiation of the laser beam, magnetic recording by the recording magnetic pole 16 is performed for the same minute magnetizing region 29A.

Figure 6:
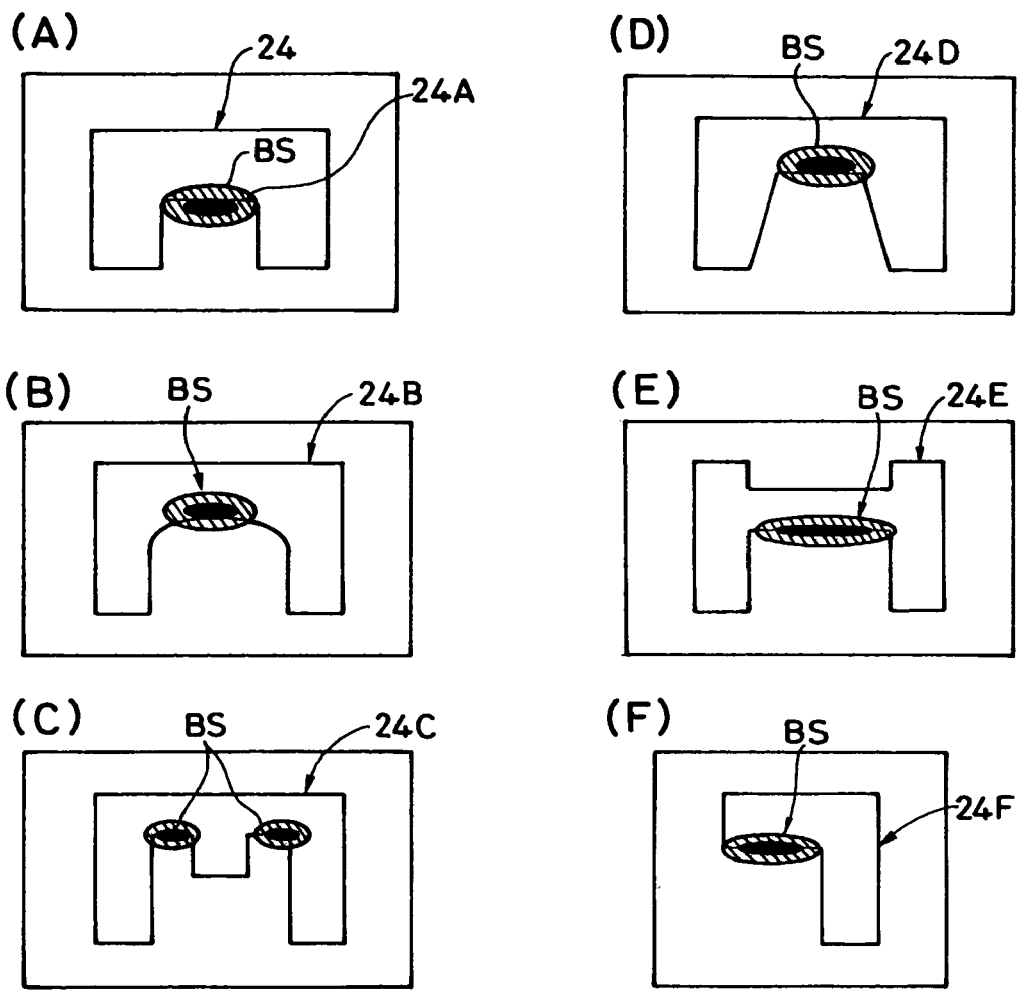
FIGS. 6A to 6F are cross-sectional views schematically showing a shape of a spot of a heating laser beam in the irradiating optical waveguide of the heat assisted magnetic recording head of the first exemplary embodiment.

The irradiating optical waveguide 24 has a C-shape and the heating laser beam forms an elliptical or oblong beam spot BS in which a horizontal side 24A of the irradiating optical waveguide 24 is a major axis, as shown in FIG. 6A.

The major axis of the flat beam spot BS is elongate in a direction perpendicular to the relative movement direction, i.e., a width direction of a track in the case where the magnetic recording medium 28 has a rotating disc shape.

In the first exemplary embodiment, the minute magnetizing regions 29A and the nonmagnetic regions 29B are alternately formed in the recording layer 28A of the magnetic recording medium 28. When the beam spot BS is incident on one minute magnetizing region 29A, a part of the major axis of the beam spot BS is also incident on the nonmagnetic regions 29B on both sides of that minute magnetizing region 29A. However, if a length of the major axis is appropriately selected, it is possible to prevent the next minute magnetizing region 29A from being irradiated with that beam spot BS.

Therefore, it is possible to accurately irradiate a range having a minute length with the laser beam in a traveling direction of the track. When being irradiated, the minute magnetizing region 29A is efficiently heated because the nonmagnetic regions 29B having a lower thermal conductivity are located on both sides of that minute magnetizing region 29A. Thus, it is possible to make the minute magnetizing region 29A smaller so as to improve a recording density.

A timing at which magnetic recording is performed for the minute magnetizing region 29A in the recording layer by means of the recording magnetic pole 16 and a timing at which that minute magnetizing region 29A is irradiated with the heating laser beam are determined considering the distance L between the recording magnetic pole 16 and the irradiating optical waveguide 24, the relative movement speed v of the magnetic recording medium 28 with respect to the recording magnetic pole 16 and the irradiating optical waveguide 24, a power of the heating laser beam, a cooling rate of the minute magnetizing region 29A, and so on in a comprehensive manner. For example, in the case where a time required for moving of a certain minute magnetizing region 29A between the irradiating optical waveguide 24 and the magnetic recording element 18 is shorter than 3 nS, it is only necessary to irradiate the minute magnetizing region 29A with the heating laser beam within ±3 nS from the timing at which the minute magnetizing region 29A is magnetized by the recording magnetic pole 16.

When the time required for moving between the irradiating optical waveguide 24 and the recording magnetic pole 16 is 3 nS or more, it is necessary to irradiate the minute magnetizing region with the heating laser beam from the irradiating optical waveguide 24 prior to the timing at which the minute magnetizing region is magnetized by the recording magnetic pole 16.

In this case, a time difference between the magnetizing timing and the timing of the irradiation with the heating laser beam can be made larger as the power of the heating laser beam is higher.

In the heat assisted magnetic recording head 10 of the first exemplary embodiment and the heat assisted magnetic recording apparatus, the laser diode 22 is arranged on the opposite side of the suspension 12 to the floating slider 14 and the heating laser beam is directed to the irradiating optical waveguide 24 via the optical waveguide 26. Therefore, it is possible to suppress an effect of a heat generated in the laser diode 22 on the recording magnetic pole 16 or the magnetic recording element 18. Thus, the output of the laser diode 22 can be made higher.

The optical waveguide 26 is a mode-conversion type, and the heating laser beam is entirely converted into a TM mode and is then emitted from the irradiating optical waveguide 24. Thus, there is no waste of the heating laser beam. Therefore, it is possible to make the output and efficiency of the heating laser beam emitted from the irradiating optical waveguide 24 higher. Moreover, the front shape of the irradiating optical waveguide 24 is a C-shape. Therefore, the shape of the beam spot BS of the heating laser beam can be made flat and elongate in a direction perpendicular to the relative movement direction, thus making the beam spot BS smaller and achieving a higher output. Since the irradiating optical waveguide 24 is provided in a region of the recording magnetic pole 16 or a region adjacent to that region, it is possible to make the heat assisted magnetic recording head compact and make manufacturing of the heat assisted magnetic recording head easier.

In the first exemplary embodiment, the distance L between the recording magnetic pole 16 and the irradiating optical waveguide 24 and the time difference between the timing at which the minute magnetizing region 29A is magnetized by the recording magnetic pole 16 and the timing at which the same minute magnetizing region 29A is irradiated with the heating laser beam can be appropriately controlled. Therefore, it is possible to achieve high-density recording.

The irradiating optical waveguide 24 has a C-shape, as shown in FIGS. 4A to 4F or FIG. 6A in the first exemplary embodiment. However, the present invention can be configured in such a manner that, as shown in FIGS. 6B to 6F, a D-shaped irradiating optical waveguide 24B, an E-shaped irradiating optical waveguide 24C, a trapezoidal irradiating optical waveguide 24D, an irradiating optical waveguide having a modified H-shape 24E, and a L-shaped irradiating optical waveguide 24F may be employed.

In any of those cases, the major axis in the flat and elongate shape of the spot of the heating laser beam is located on the central horizontal side.

Figure 7:
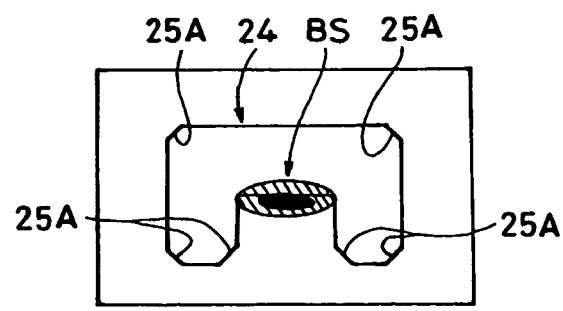
FIG. 7 is an enlarged front view schematically showing a modified example of the irradiating optical waveguide.

Moreover, outer corners 25 other than corners around the center of the irradiating optical waveguide 24, 24B, 24C, 24D, 24E, or 24F may be formed in an arc shape or be chamfered, as shown in FIG. 7. In this case, a convergence efficiency of an electric field can be improved.

Figure 8:
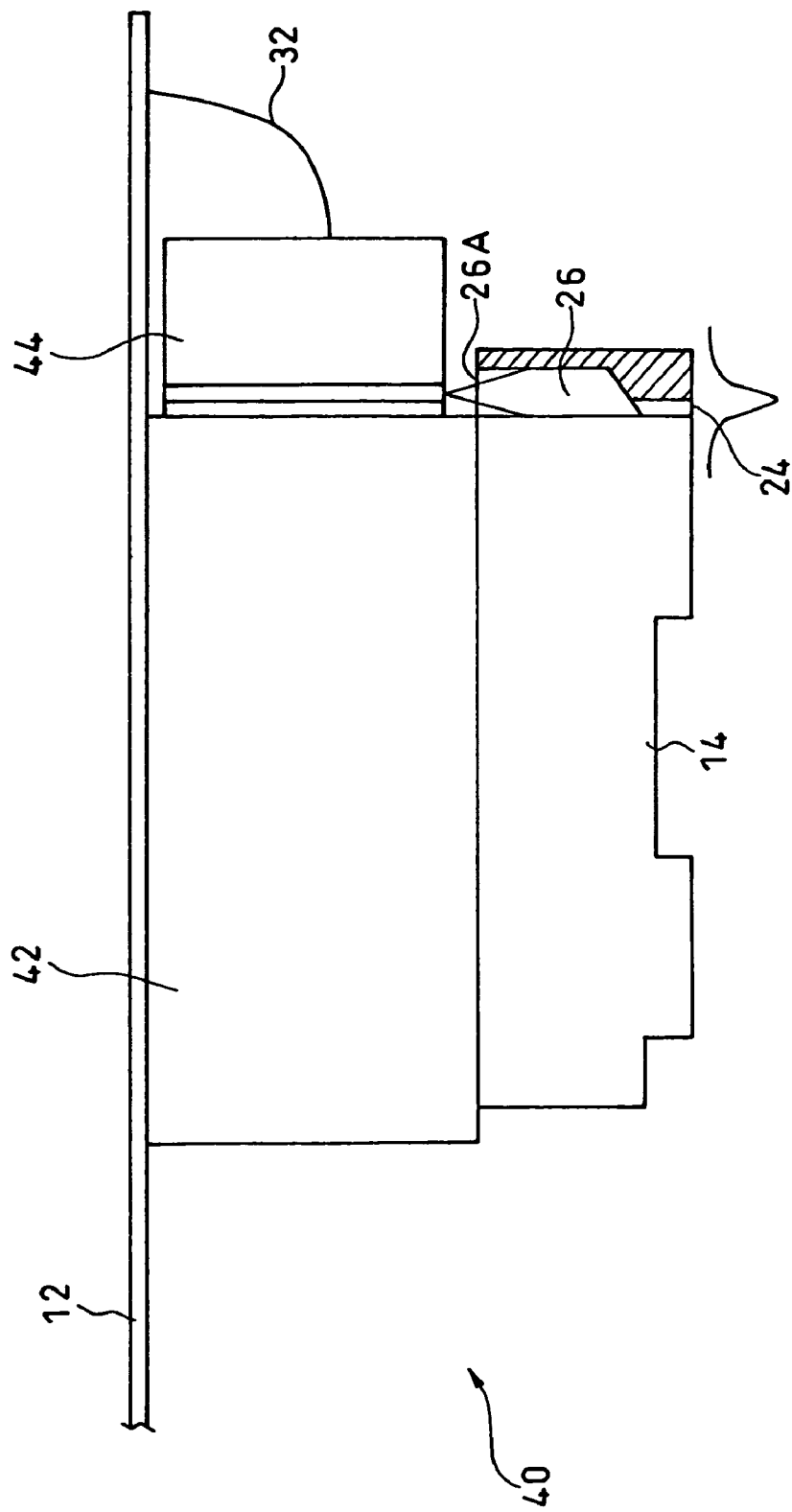
FIG. 8 is an enlarged cross-sectional view schematically showing a heat assisted magnetic recording head according to a second exemplary embodiment of the present invention.

Next, a heat assisted magnetic recording head 40 according to a second exemplary embodiment of the present invention is described with reference to FIG. 8.

The heat assisted magnetic recording head 40 has the same structure as that in the first exemplary embodiment except that in the heat assisted magnetic recording head 10 shown in FIG. 1 a heat sink 42 and a laser diode 44 supported by the heat sink 42 are arranged below the suspension 12 in FIG. 8. Therefore, in the second exemplary embodiment, the floating slider 14 is arranged below the heat sink 42 attached below the suspension 12 in FIG. 8.

It is not necessary to form a through hole for passing a heating laser beam emitted from the laser diode 44 therethrough in the suspension 12 in the heat assisted magnetic recording heed 40 of the second exemplary embodiment. Except for that, a structure, an operation, and advantages of the second exemplary embodiment are the same as those of the first exemplary embodiment. Therefore, the description thereof is omitted here.

Figure 9:
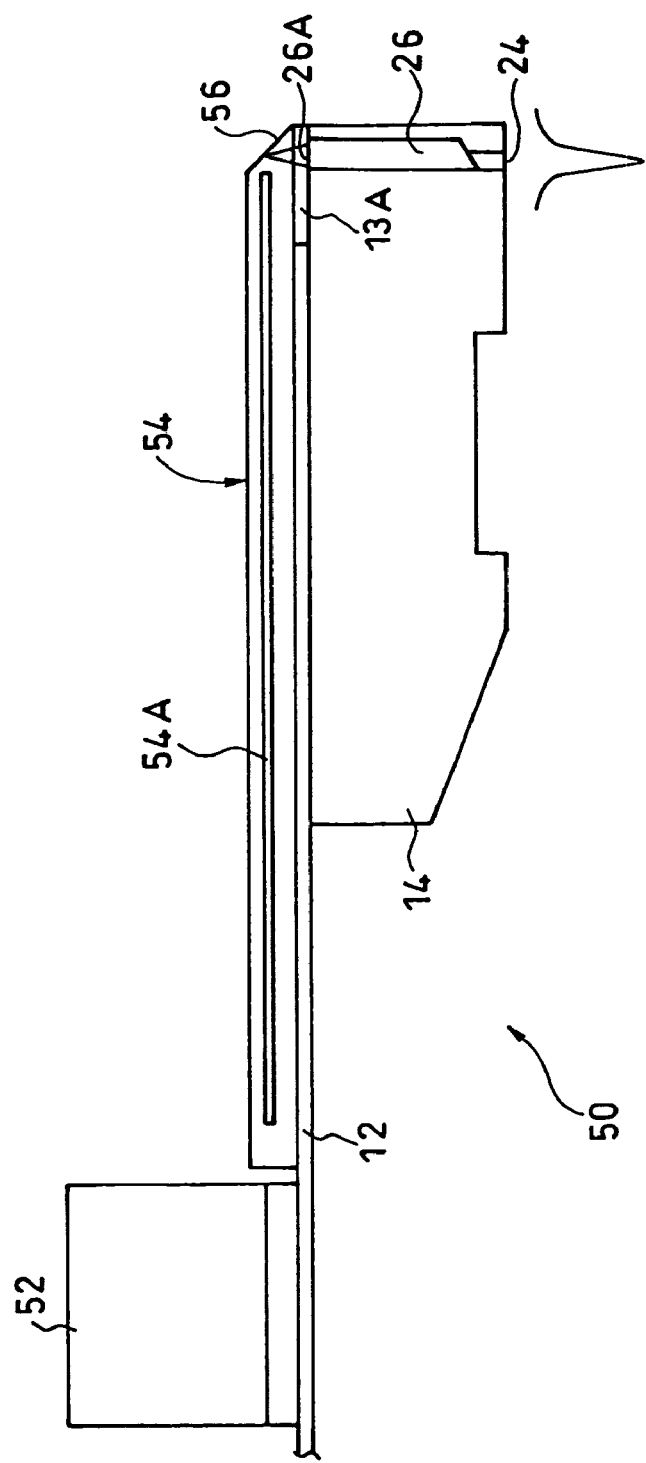
FIG. 9 is an enlarged cross-sectional view schematically showing a heat assisted magnetic recording head according to a third exemplary embodiment of the present invention.

Next, a heat assisted magnetic recording head 50 according to a third exemplary embodiment of the present invention is described with reference to FIG. 9.

The heat assisted magnetic recording head 50 is the same as the heat assisted magnetic recording head 10 of the first exemplary embodiment in that the arrangement of the suspension 12, the floating slider 14 supported below the suspension 12 in FIG. 9, the recording magnetic pole 16, the irradiating optical waveguide 24, and the optical waveguide 26, but is different in that a laser diode 52 is arranged at a base end side of the suspension 12 and a heating laser beam is directed from the laser diode 52 to the incident surface 26A of the optical waveguide 26 via a second optical waveguide 54.

More specifically, the second optical waveguide 54 is a polymer waveguide. A base end of the polymer waveguide is arranged to face a portion of the laser diode 52 from which the laser beam is emitted. A 45-degree V-shaped groove mirror 56 is formed at a top end (right end in FIG. 9) of the second optical waveguide 54.

The V-shaped groove mirror 56 is provided with a reflection film, and reflects the heating laser beam, that travels through a core 54A of the second optical waveguide 54 as the polymer waveguide to the V-shaped groove mirror 56, downward at an angle of 45 degrees, thereby making the heating laser beam incident on the incident surface 26A of the optical waveguide 26. The through hole 13A formed in the suspension 12 is arranged between the V-shaped groove mirror 56 and the incident surface 26A.

In the third exemplary embodiment, the second optical waveguide 54 largely separates the laser diode 52 from the magnetic recording element 18 and other parts. Therefore, almost all the effect of the heat from the laser diode 52 can be eliminated. Moreover, the laser diode 52 that has a relatively large mass is arranged on the base end side of the suspension 12. Therefore, mass and inertia of a top end portion including the floating slider 14 and the magnetic recording element 18 and other parts that are mounted on the floating slider 14 can be reduced, thus suppressing lowering of a floating performance of the floating slider 14.

Figure 10:
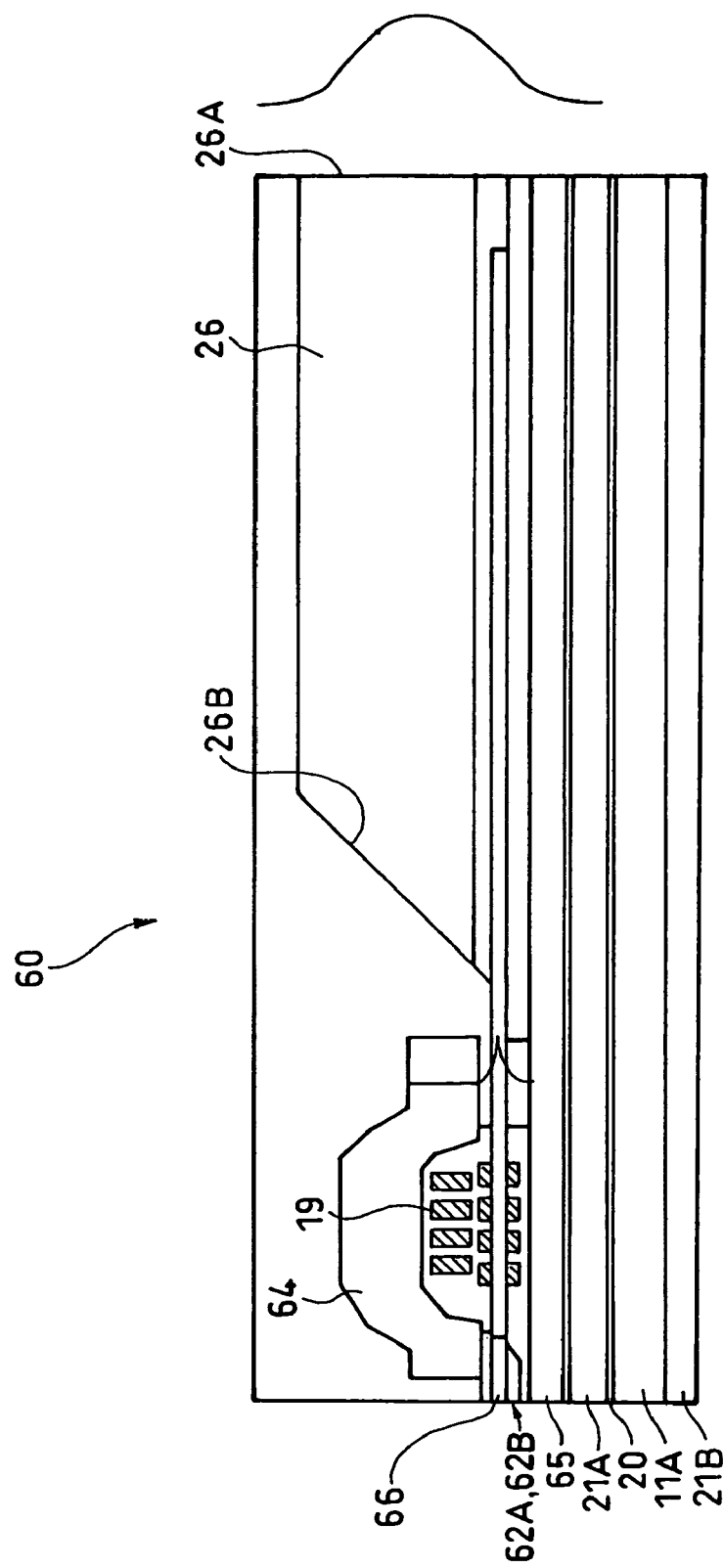
FIG. 10 is an enlarged cross-sectional view schematically showing a region including a recording magnetic pole, a reproducing element, and an optical waveguide in the heat assisted magnetic recording head according to a fourth exemplary embodiment of the present invention.

Next, a heat assisted magnetic recording head 60 according to a fourth exemplary embodiment of the present invention is described with reference to FIG. 10.

The heat assisted magnetic recording head 60 is a ring type magnetic head for longitudinal recording. In the heat assisted magnetic recording head 60, a trailing side recording magnetic pole 62A in which a front shape is rectangular and a leading side recording magnetic pole 62B that is trimmed are provided with a recording gap 63 interposed therebetween, as shown in FIGS. 11A to 11D that are enlarged views. The numeral 64 denotes a yoke in FIG. 10.

Figure 11:
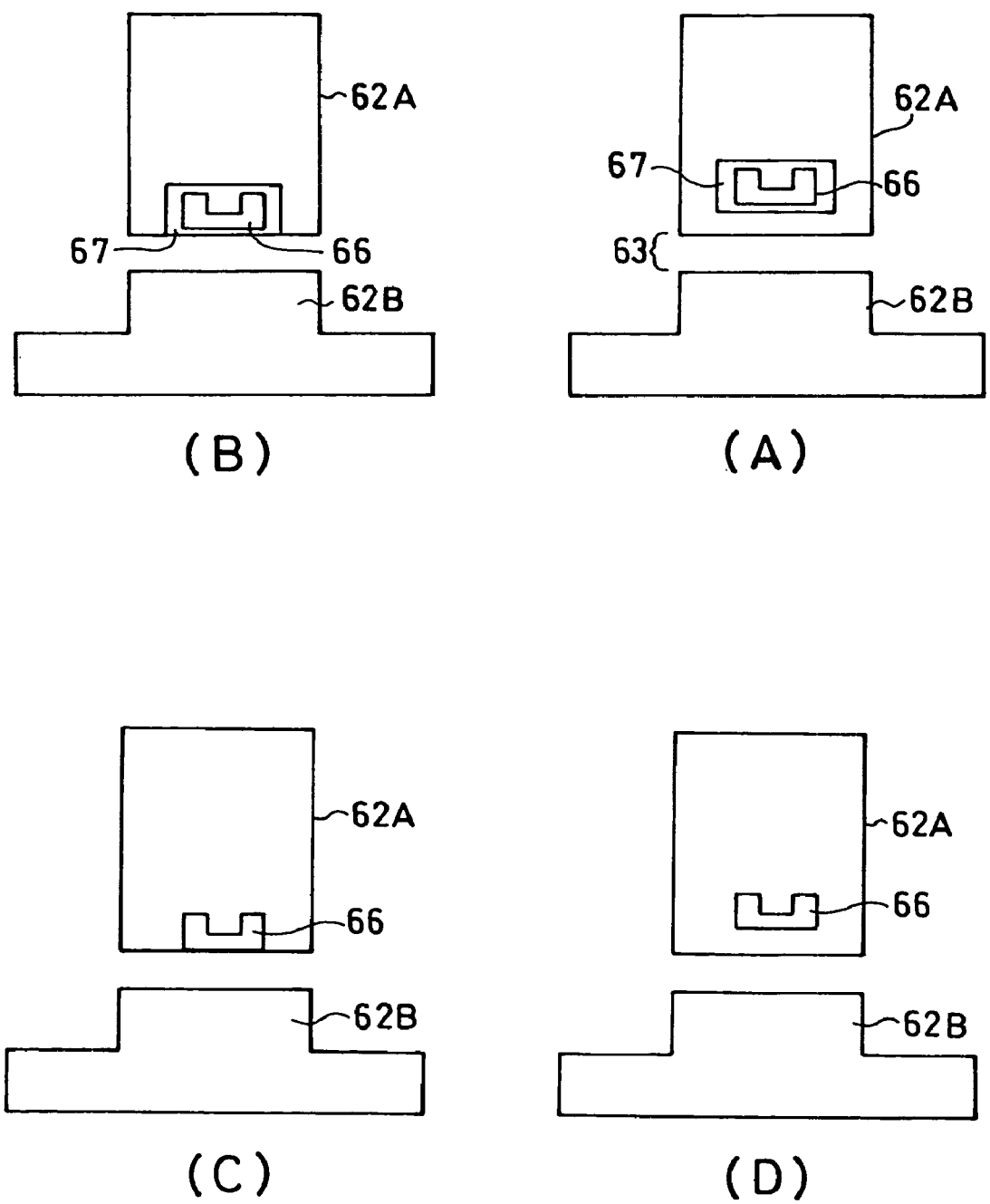
FIGS. 11A to 11D are enlarged front views schematically showing a relationship between the recording magnetic pole and an irradiating optical waveguide in the heat assisted magnetic recording head of the fourth exemplary embodiment.

An irradiating optical waveguide 66 is arranged in the inside of an edge of the trailing side recording magnetic pole 62A, which faces the recording gap 63, while being surrounded by a metal 67, as shown in FIG. 11A. The irradiating optical waveguide 66 may be arranged along the edge in the region of the trailing side recording magnetic pole 62A, while being surrounded by the metal 67, as shown in FIG. 11B. Moreover, without providing the metal 67 surrounding the irradiating optical waveguide 66, the irradiating optical waveguide 66 may be provided to be adjacent to the recording gap 63 in the region of the trailing side recording magnetic pole 62A, as shown in FIG. 11C, or in the region of the trailing side recording magnetic pole 62A, as shown in FIG. 1D. In the cases shown in FIGS. 11A to 11D, it is preferable to form a dielectric material first when the irradiating optical waveguide 66 is formed.

Except for the above, the structure of the heat assisted magnetic recording head 60 of the fourth exemplary embodiment is the same as the heat assisted magnetic recording head 10 shown in FIG. 3. Thus, the same parts are labeled with the same reference numerals as those in FIG. 3 and the description thereof is omitted.

Figure 12:
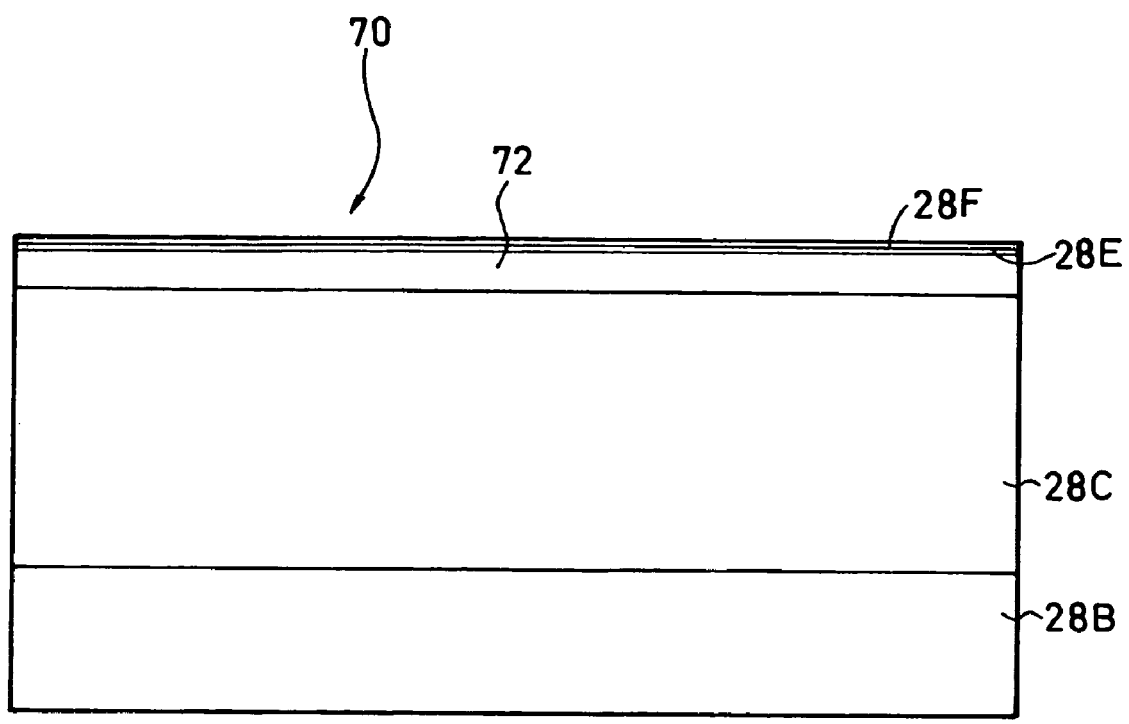
FIG. 12 is an enlarged cross-sectional view schematically showing a magnetic recording medium in which a continuous thin film forms a recording layer.

Magnetic recording using the ring type heat assisted magnetic recording head 60 for longitudinal recording according to the fourth exemplary embodiment is performed for a magnetic recording medium 70 in which a continuous thin film forms a recording layer 72, as shown in FIG. 12. Except for the above, the same parts of the magnetic recording medium 70 as those in the magnetic recording medium 28 in FIG. 5 are labeled with the same reference numerals as those in FIG. 5 and the description thereof is omitted.

A manner of performing magnetic recording and an operation and advantages of heating by the heating laser beam during magnetic recording in the fourth exemplary embodiment are the same as those in the first exemplary embodiment. Therefore, the description of the magnetic recording and the heating by the heating laser beam can be omitted.

What is claim is:

1. A heat assisted magnetic recording head comprising:
a magnetic recording element including a recording magnetic pole and a magnetic read element that are mounted on a floating slider;
a laser diode serving as a light source of a heating laser beam; and
an irradiating optical waveguide, arranged close to the magnetic recording element, for directing the heating laser beam to a minute magnetizing region of a magnetic recording medium in which recording is performed by the recording magnetic pole, wherein
an optical waveguide for directing the heating laser beam to the irradiating optical waveguide is provided on a rear side of the irradiating optical waveguide;
the floating slider is supported by a surface of a suspension;
a heat sink is supported by another surface of the suspension;
the laser diode is supported by a side surface of the heat sink; and
the heating laser beam emitted from the laser diode is incident on an incident surface being located on an opposite side of the irradiating optical waveguide through a through hole formed in the suspension.

2. A magnetic recording apparatus comprising:
the heat assisted magnetic recording head according to claim 1; and
the magnetic recording medium, wherein
the magnetic recording medium includes a recording layer having an anisotropic property in a thickness direction, and the recording layer is formed from one of a magnetic material and a magnetooptical material in which coercivity Hc lowered by temperature increase caused by irradiation with the heating laser beam is 10 kOe or less during recording.

3. The magnetic recording apparatus according to claim 2, wherein:
the magnetic recording medium includes a plurality of layers, and in at least one of the plurality of layers, at least a region that is adjacent to the minute magnetizing region or an overlapping region overlapping the minute magnetizing region in the thickness direction in a direction perpendicular to a relative movement direction of the magnetic recording medium with respect to the recording magnetic pole is formed from a nonmagnetic layer having a lower thermal conductivity than that of the minute magnetizing region or the overlapping region.

4. A magnetic recording apparatus comprising:
the heat assisted magnetic recording head according to claim 1; and
the magnetic recording medium, wherein
the magnetic recording medium includes a recording layer having an anisotropic property in a relative movement direction of the magnetic recording medium with respect to the recording magnetic pole, and the recording layer is formed from a magnetic material in which coercivity Hc lowered by temperature increase caused by irradiation with the heating laser beam is 8 kOe or less during recording.

5. The magnetic recording apparatus according to claim 4, wherein:
the magnetic recording medium includes a plurality of layers, and in at least one of the plurality of layers, at least a region that is adjacent to the minute magnetizing region or an overlapping region overlapping the minute magnetizing region in the thickness direction in a direction perpendicular to a relative movement direction of the magnetic recording medium with respect to the recording magnetic pole is formed from a nonmagnetic layer having a lower thermal conductivity than that of the minute magnetizing region or the overlapping region.

6. A heat assisted magnetic recording head comprising:
a magnetic recording element including a recording magnetic pole and a magnetic read element that are mounted on a floating slider;
a laser diode serving as a light source of a heating laser beam; and
an irradiating optical waveguide, arranged close to the magnetic recording element, for directing the heating laser beam to a minute magnetizing region of a magnetic recording medium in which recording is performed by the recording magnetic pole, wherein
an optical waveguide for directing the heating laser beam to the irradiating optical waveguide is provided on a rear side of the irradiating optical waveguide;
the floating slider is supported by a surface of a suspension;
the laser diode is attached on a rear side of the floating slider in such a manner that the heating laser beam emitted from the laser diode is incident on an incident surface of the optical waveguide, the incident surface being located on an opposite side to the irradiating optical waveguide; and
a second optical waveguide is provided on another surface of the suspension, the second optical waveguide being optically connected to the incident surface of the optical waveguide at its top end and to a surface of the laser diode from which the heating laser beam is emitted, at its base end.

7. The heat assisted magnetic recording head according to claim 6, wherein the top end of the second optical waveguide is optically connected to the incident surface of the optical waveguide via a V-shaped groove mirror that is provided on the other surface of the suspension.

8. The heat assisted magnetic recording head according to claim 6, wherein the second optical waveguide is a polymer waveguide.

9. A heat assisted magnetic recording head comprising:
a magnetic recording element including a recording magnetic pole and a magnetic read element that are mounted on a floating slider;
a laser diode serving as a light source of a heating laser beam: and
an irradiating optical waveguide, arranged close to the magnetic recording element, for directing the heating laser beam to a minute magnetizing region of a magnetic recoding medium in which recording is performed by the recording magnetic pole, wherein
an optical waveguide for directing the heating laser beam to the irradiating optical waveguide is provided on a rear side of the irradiating optical waveguide;
the irradiating optical waveguide is formed from a dielectric material having a dielectric constant $\epsilon$ of 1 or more, the dielectric material including air;
a front shape of the irradiating optical waveguide is one of a C-shape, a D-shape, an E-shape, a trapezoidal shape, a modified H-shape, and an L-shape; and
the irradiating optical waveguide is configured in such a manner that the heating laser beam is emitted along a long side extending in a direction perpendicular to a relative movement direction of the recording magnetic pole and a recording medium with respect to each other, and the heating laser beam is flat in the direction.

10. A heat assisted magnetic recording head comprising:
a magnetic recording element including a recording magnetic pole and a magnetic read element that are mounted on a floating slider;
a laser diode serving as a light source of a heating laser beam; and
an irradiating optical waveguide, arranged close to the magnetic recording element, for directing the heating laser beam to a minute magnetizing region of a magnetic recoding medium in which recording is performed by the recording magnetic pole, wherein
an optical waveguide for directing the heating laser beam to the irradiating optical waveguide is provided on a rear side of the irradiating optical waveguide;
the recording magnetic pole has a magnetic monopole structure for perpendicular magnetic recording, the pole being formed from a soft magnetic metal;
the recording magnetic pole is isolated by shields for the recording magnetic pole arranged on both sides of the recording magnetic pole in a thickness direction that is a relative movement direction of the recording magnetic pole with respect to a magnetic recording medium;
a front shape of the recording magnetic pole is trapezoidal or rectangular; and
a thickness Pt of the recording magnetic pole in the thickness direction and a width Pw thereof in a width direction perpendicular to the thickness direction are 20 nm or more and 200 nm or less.

11. The heat assisted magnetic recording head according to claim 10, wherein a width Gw of the irradiating optical waveguide in the width direction and a height Gt thereof in the thickness direction each are 100 nm or less and satisfy Gw $\leqq$ Pw and Gt $\leqq$ Pt.

12. The heat assisted magnetic recording head according to claim 11, wherein: the irradiating optical waveguide is arranged in one of a region located on a trailing side of a center of the recording magnetic pole and a region adjacent to a trailing edge of the recording magnetic pole in such a manner that the heating laser beam exiting from the irradiating optical waveguide is an evanescent wave having a beam diameter of 100 nm or less and a position irradiated with the evanescent wave of a maximum power is located within +20 to 40 nm from the trailing edge in the relative movement direction.

13. heat assisted magnetic recording head comprising:
a magnetic recording element including a recording magnetic pole and a magnetic read element that are mounted on a floating slider;
a laser diode serving as a light source of a heating laser beam; and
an irradiating optical waveguide, arranged close to the magnetic recording element, for directing the heating laser beam to a minute magnetizing region of a magnetic recoding medium in which recording is performed by the recording magnetic pole, wherein
an optical waveguide for directing the heating laser beam to the irradiating optical waveguide is provided on a rear side of the irradiating optical waveguide;
the recording magnetic pole is formed from a soft magnetic metal and has a ring structure for longitudinal recording that includes a trailing side recording magnetic pole and a leading side recording magnetic pole, the leading recording magnetic pole being trimmed;
a front shape of the trailing side recording magnetic pole is rectangular; and
a thickness Pt of the recording magnetic pole in a thickness direction and a width Pw thereof in a width direction perpendicular to the thickness direction each are 200 nm or less, the thickness direction being a relative movement direction of the recording magnetic pole with respect to the magnetic recording medium.

14. The heat assisted magnetic recording head according to claim 13, Wherein: a width Gw of the irradiating optical waveguide in the width direction and a height Gt thereof in the thickness direction each are 100 nm or less and satisfy Gw $\leqq$ Pw and Gt $\leqq$ Pt.

15. The heat assisted magnetic recording head according to claim 13, wherein: the irradiating optical waveguide is arranged in one of a region located on a trailing side of a center of the recording magnetic pole and a region adjacent to a trailing edge of the recording magnetic pole in such a manner that the heating laser beam exiting from the irradiating optical waveguide is an evanescent wave having a beam diameter of 100 nm or less and a position irradiated with the evanescent wave of a maximum power is within +20 to 40 nm from the trailing edge in the relative movement direction.

16. A heat assisted magnetic recording head comprising:
a magnetic recording element including a recording magnetic pole and a magnetic read element that are mounted on a floating slider;
a laser diode serving as a light source of a heating laser beam; and
a laser controller for controlling a timing of emission of the heating laser beam by the laser diode,
an irradiating optical waveguide, arranged close to the magnetic recording element, for directing the heating laser beam to a minute magnetizing region of a magnetic recoding medium in which recording is performed by the recording magnetic pole, wherein
an optical waveguide for directing the heating laser beam to the irradiating optical waveguide is provided on a rear side of the irradiating optical waveguide; and
the laser controller performs control in such a manner that the minute magnetizing region is irradiated with the heating laser beam within +3 nS from a timing at which the minute magnetizing region is magnetized by the recording magnetic pole when L/v <3 nS, where L is a distance between the recording magnetic pole and the magnetic read element and v is a relative movement speed of the magnetic recoding medium with respect to the recording magnetic pole and the magnetic read element in a vicinity of the recording magnetic pole and the magnetic read element.

17. The heat assisted magnetic recording head according to claim 16, wherein the laser controller is arranged to control the laser diode to make pulse oscillation in synchronization with the recording magnetic pole.

18. A heat assisted magnetic recording head comprising:
a magnetic recording element including a recording magnetic pole and a magnetic read element that are mounted on a floating slider;
a laser diode serving as a light source of a heating laser beam; and
a laser controller for controlling a timing of emission of the heating laser beam by the laser diode,
an irradiating optical waveguide, arranged close to the magnetic recording element, for directing the heating laser beam to a minute magnetizing region of a magnetic recoding medium in which recording is performed by the recording magnetic pole, wherein
an optical waveguide for directing the heating laser beam to the irradiating optical waveguide is provided on a rear side of the irradiating optical waveguide; and
the laser controller performs control in such a manner that the minute magnetizing region is irradiated with the heating laser beam prior to a timing at which the minute magnetizing region is magnetized by the recording magnetic pole when $L/v \geqq 3$ nS, where L is a distance between the recording magnetic pole and the magnetic read element and v is a relative movement speed of the magnetic recording medium with respect to the recording magnetic pole and the magnetic read element in a vicinity of the recording magnetic pole and the magnetic read element.

* * * * *